(12) United States Patent
Okada

(10) Patent No.: US 6,259,168 B1
(45) Date of Patent: Jul. 10, 2001

(54) VEHICLE SECURITY CONTROL APPARATUS

(75) Inventor: Hiroki Okada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/349,162

(22) Filed: Jul. 9, 1999

(30) Foreign Application Priority Data

Jul. 10, 1998 (JP) .................................. 10-196205

(51) Int. Cl.$^7$ .................................................. B60R 25/04
(52) U.S. Cl. ............... 307/10.5; 307/10.3; 123/198 DB; 340/825.31; 340/825.34
(58) Field of Search ................. 307/10.2, 10.3, 307/10.5; 123/198 DD, 198 DC; 180/287; 340/825.72, 539, 426, 825.31, 825.34

(56) References Cited

U.S. PATENT DOCUMENTS

| | | | |
|---|---|---|---|
| 5,561,332 | * 10/1996 | Udo et al. ............................ | 307/10.5 |
| 5,684,454 | * 11/1997 | Nishioka et al. ..................... | 340/426 |
| 5,736,935 | * 4/1998 | Lambropoulos ................. | 340/825.72 |
| 6,025,653 | * 2/2000 | Hayashi et al. ...................... | 307/10.2 |

FOREIGN PATENT DOCUMENTS 3-21575   1/1991  (JP) .
2539697   7/1996  (JP) .

* cited by examiner

Primary Examiner—Albert W. Paladini
(74) Attorney, Agent, or Firm—Pillsbury Winthrop LLP

(57) ABSTRACT

A vehicle security control apparatus has a connecting portion within a vehicle for receiving a switch device and a determination backup device. The determination backup device determines whether to permit or prohibit use of the vehicle by performing a code comparison with the switch device connected to the connecting portion if a determiner is unable to determine whether to permit or prohibit the use of the vehicle. Therefore, the apparatus is able to permit use of the vehicle even if the battery of a portable device is depleted or radio interference occurs.

18 Claims, 7 Drawing Sheets

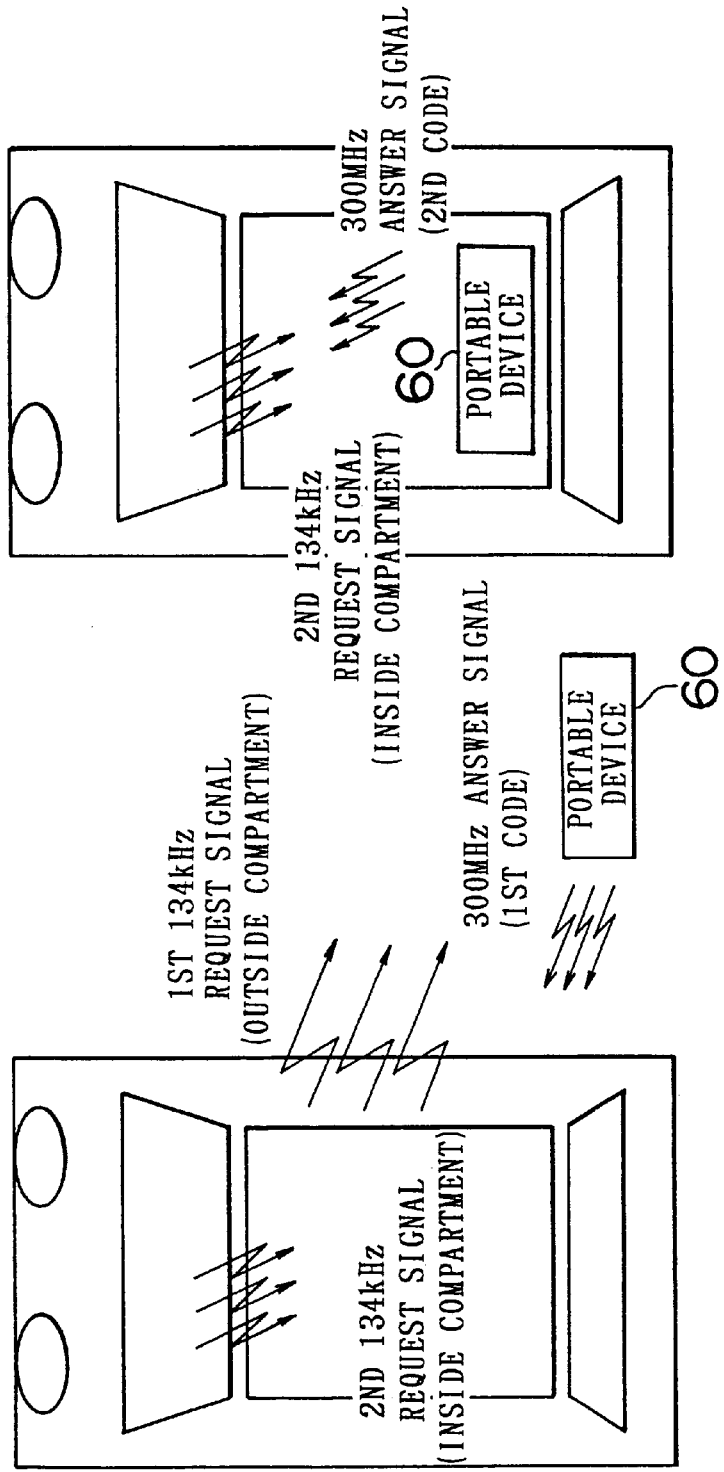

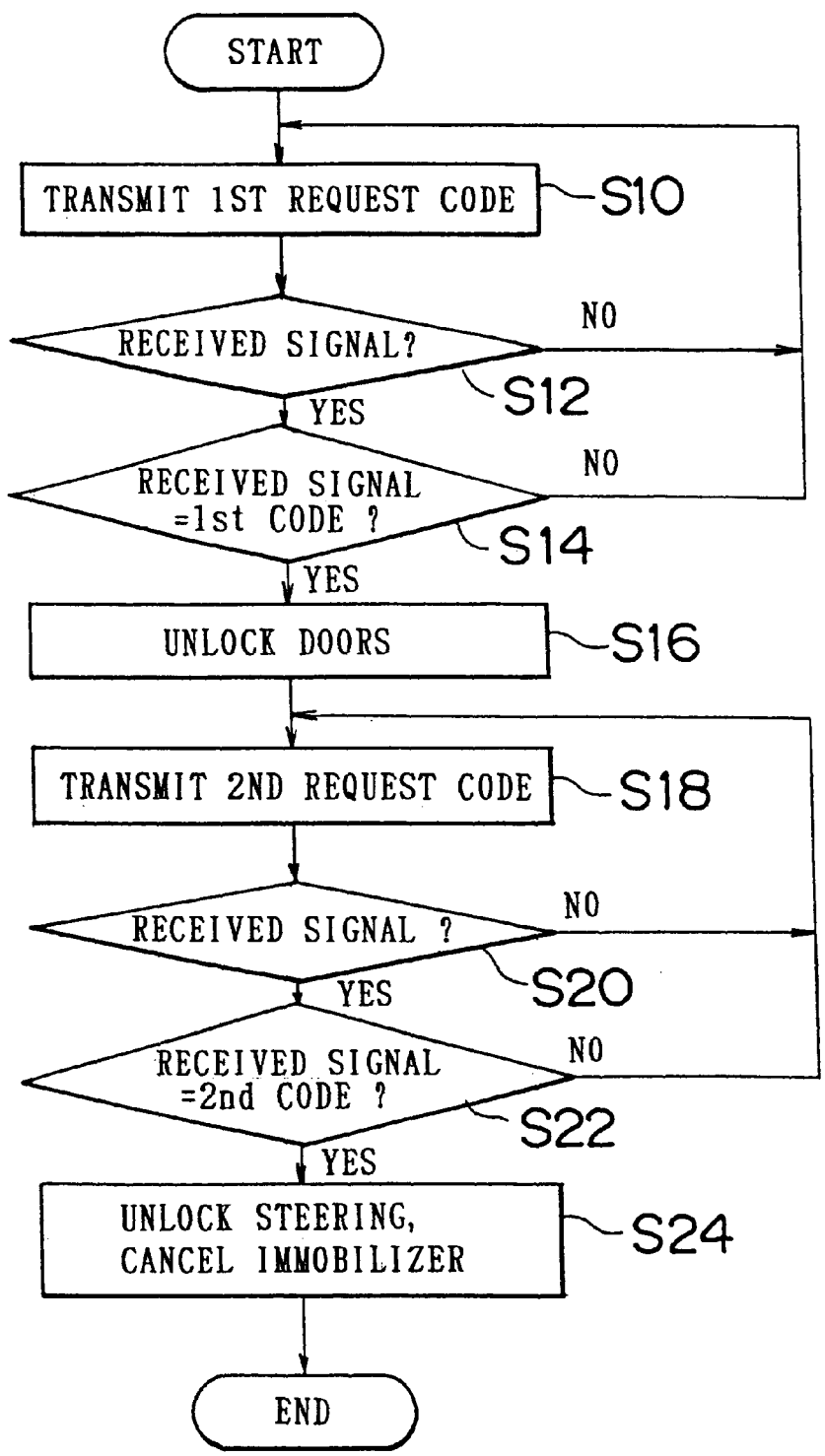

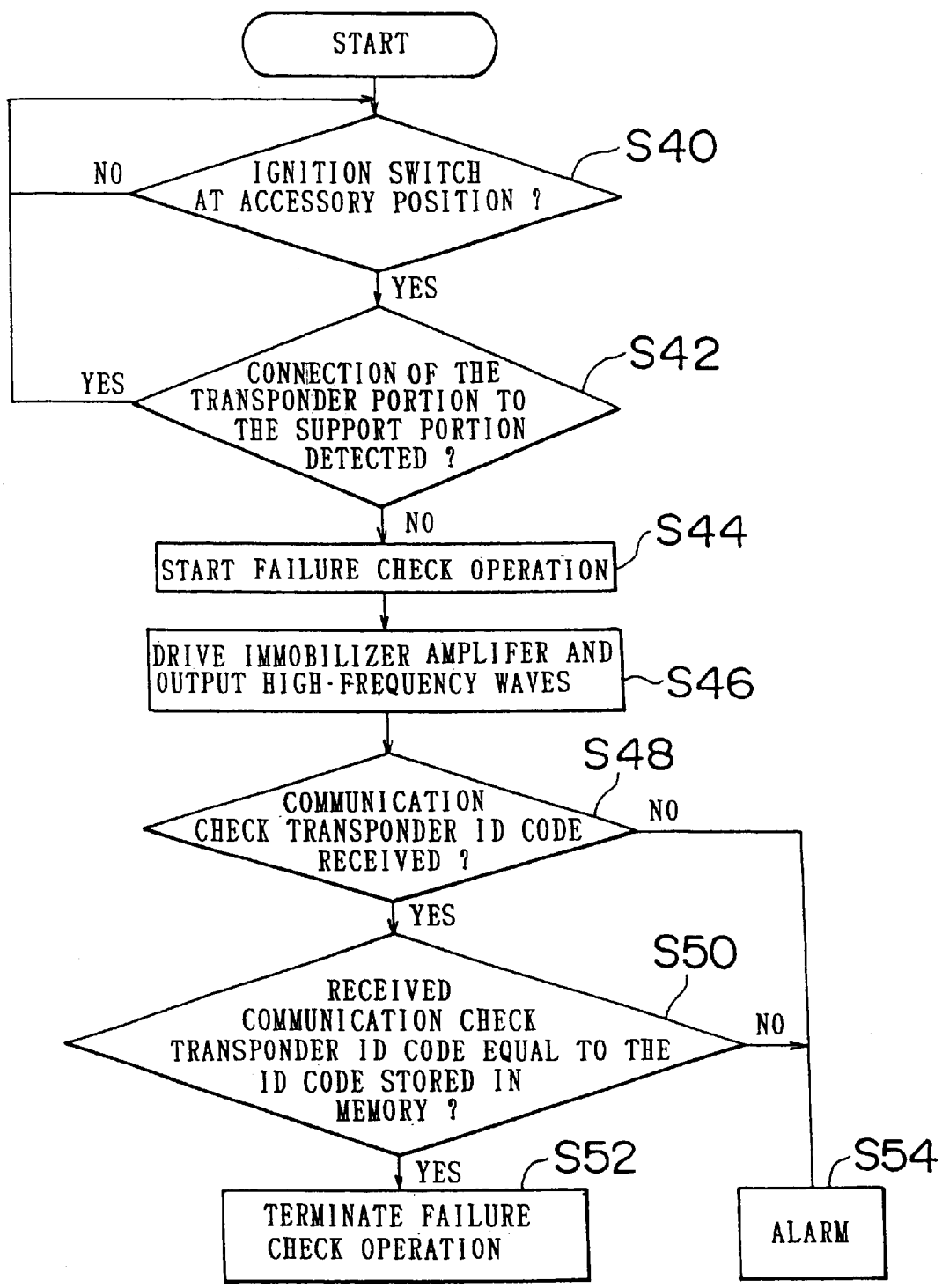

VEHICLE SECURITY CONTROL APPARATUS

INCORPORATION BY REFERENCE

The disclosure of Japanese Patent Application No. HEI 10-196205 filed on Jul. 10, 1998, including the specification, drawings and abstract, is incorporated herein by reference in its entirety.

BACKGROUND OF THE INVENTION

1. Field of the invention

The present invention relates to a vehicle security control apparatus and, more particularly, to a vehicle security control apparatus that performs code comparison through communication with a portable device and, based on the result of comparison, permits or prohibits of use of a vehicle.

2. Description of the Related Art

There are several related-art vehicle security control apparatuses that perform code comparison through communication with a portable device and, based on the result of comparison, either permits or prohibits of use of a vehicle.

JP3-21575, as for example, describes a technology in which when a person operates a manual switch provided in the vehicle, communication between a secret code transmitter carried by the person and a receiver provided in a vehicle is performed. The code signal from the transmitter is compared with a pre-stored code by a code comparator provided in the vehicle. If the comparison signified that the operating person is an authorized user, the running power circuit of the vehicle is turned on and it is possible to unlock the vehicle via the manual switch provided in the vehicle.

However, two potential drawbacks of the related technology is its dependency to signal power source and susceptibility to radio interference. For example, if the normal operation of the code comparison by the code comparator is hindered due to depletion of the power source cell of the secret code transmitter carried by a user, radio interference noises or the like, it becomes impossible to activate the vehicle's power circuit and unlocked the vehicle.

SUMMARY OF THE INVENTION

Accordingly, it is an object of the present invention to provide a vehicle security control apparatus wherein at least a portion of a portable device is connected directly to a receptacle or connecting portion provided within a vehicle in order to perform code comparison and determine whether to permit or prohibit use of the vehicle, so that access to the vehicle can be permitted even if the battery cell of the portable device is exhausted or radio interference occurs.

In accordance with the invention, a vehicle security control apparatus includes a portable device capable of being carried and transmitting a signal, a vehicle-installed device, located within the vehicle, that receives the signal from the portable device, a determiner that determines whether to permit or prohibit use of the vehicle based on a result of a code comparison through communication between the vehicle-installed device and the portable device, a connecting portion within the vehicle, a switch device that can connect to the connecting portion, and a determination backup device that determines whether to permit or prohibit the use of the vehicle by performing the code comparison with the switch device connected to the connecting portion if it is impossible for the determiner to determine whether to permit or prohibit use of the vehicle.

Since the vehicle security control apparatus performs the code comparison through cooperation of the switch device connected to the connecting portion of the vehicle and the determination backup device, the apparatus can permit use of the vehicle even if the battery of the portable device is exhausted or radio interference occurs.

The vehicle security control apparatus may further include a connection detector that (1) detects a connection between switch device and the connecting portion and (2) operates the determination backup device. The vehicle security control apparatus may also include an operation prohibiter that prohibits the determiner from operating if the determination backup device is operating.

Because the connection detector operates the determination backup device only when the switch device is connected to the connecting portion, useless electric power consumption is prevented and the danger of radio interference is eliminated even if the determination backup device and the determiner use the same signal frequency.

The switch device may be at least a portion of the portable device, i.e. may be formed by a portion of the portable device or the entire portable device.

The vehicle security control apparatus may further include a door open-close permitting device that permits a door to be opened or closed if the determination backup device determines to permit the use of the vehicle.

Therefore, if use of the vehicle is permitted by the determination backup device, the door may be opened or closed.

The vehicle security control apparatus may further include an engine start permitting device that permits an engine of the vehicle to be started if the determination backup device permits use of the vehicle.

Therefore, if permission of the use of the vehicle is permitted by the determination backup device, the engine of the vehicle may be started and the vehicle can be driven.

Furthermore, in the vehicle security control apparatus, the vehicle may have a detachable start switch for starting the engine, and the connecting portion may be provided at a position from which the start switch is detachable.

If the connecting portion is provided at a position from which the start switch is detachable, at least a portion of the portable device can be connected to the connecting portion and operated to start the engine when the battery of the portable device is depleted or occurrence of radio interference in substantially the same manner as a conventional key is used.

The vehicle security control apparatus may further include a steering unlock permitting device that permits a steering of the vehicle to be unlocked if the determination backup device determines that the use of the vehicle is authorized.

Therefore, if use of the vehicle is authorized, the steering of the vehicle may be unlocked and the vehicle can be driven.

In the vehicle security control apparatus, at least a portion of the switch device that can connect to the connecting portion may have a transponder circuit that transmits a specific code. The determination backup device may receive the specific code from the transponder and compare the specific code with a pre-stored code specific to the vehicle.

Therefore, the transponder circuit of the portable device transmits a specific code. The determination backup device receives the specific code from the transponder circuit and compares the code with the pre-stored code specific to the vehicle. Hence, it becomes possible to determine whether the portable device is an authorized portable device corresponding to the vehicle.

Further, in the vehicle security control apparatus, a range of a permitted uses of the vehicle determined by the determination backup device may be restricted relative to a range of permitted uses of the vehicle determined by the determiner.

Therefore, if the use of the vehicle is permitted by the determination backup device, further permitted uses of the vehicle are restricted, so that in the case of a theft for example, the damage can be minimized.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIG. 3 is a schematic illustration of communication between the first and second transmitting antennas and the portable device;

FIG. 4 is a flowchart illustrating an embodiment of the engine start operation executed by an ECU in the apparatus of the invention;

FIG. 8 is a flowchart illustrating an embodiment of the failure check operation executed by ECU of the apparatus of the invention.

DETAILED DESCRIPTION OF PREFERRED EMBODIMENTS

Preferred embodiments of the present invention will be described in detail hereinafter with reference to the accompanying drawings.

Figure 1:
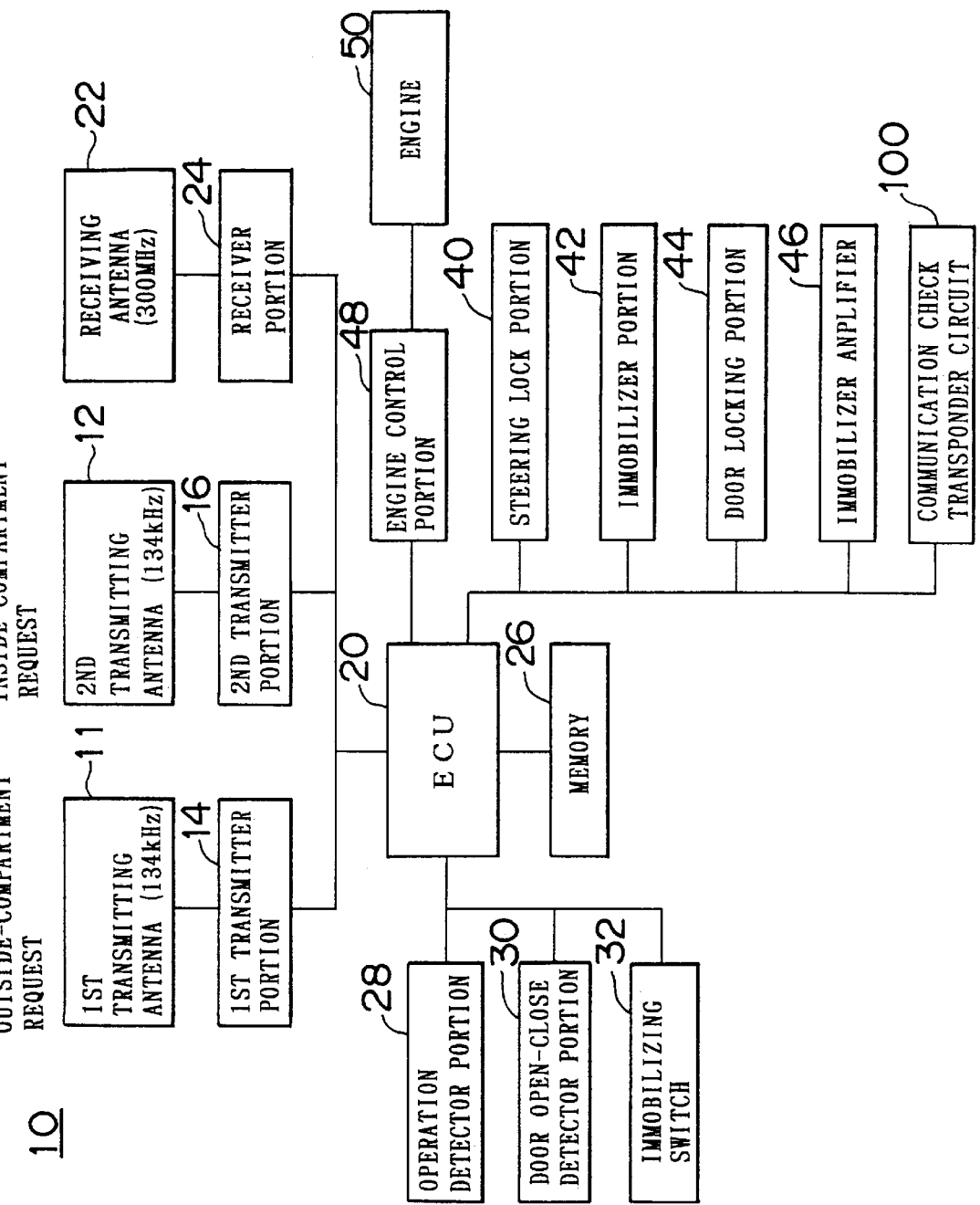
FIG. 1 is a block diagram of an embodiment of the vehicle-installed device of the vehicle security control apparatus of the invention.

FIG. 1 is a block diagram of an embodiment of the vehicle-installed device of the vehicle security control apparatus of the invention. Referring to FIG. 1, a vehicle-installed device 10 has two antennas, a first transmitting antenna 11 and a second transmitting antenna 12. The first transmitting antenna 11 may be located a door handle of a vehicle (four-wheeled vehicle). The second transmitting antenna 12 may be located near an instrument panel in a compartment of the vehicle. The first transmitting antenna 11 is connected to a first transmitter portion 14 and the second transmitting antenna 12 is connected to a second transmitter portion 16. The first transmitter portion 14 and the second transmitter portion 16 are connected to an electronic control unit (ECU) 20.

The ECU 20 supplies first and second request codes to the first transmitter portion 14 and the second transmitter portion 16, respectively. The first and second request codes are modulated to provide request signals having a frequency of, for example, 134 kHz, which are transmitted from the first transmitting antenna 11 and the second transmitting antenna 12 to a portable device 60. However, the first transmitter portion 14 and the second transmitter portion 16 may be combined into a single circuit. The vehicle also has with a receiving antenna 22. A signal received from the portable device 60 by the receiving antenna 22, which has a signal frequency of, for example, 300 MHz, is demodulated by a receiver circuit 24 and then supplied to the ECU 20.

A memory 26 is connected to the ECU 20. Pre-stored in the memory 26 are a plurality of codes that are different from one another. For example, a first code for a door lock, a second code for engine start, a transponder ID code, and the like. The memory 26 is a non-volatile memory such as an EEPROM or the like, so that the stored content is retained even if power supply is cut off.

An operation detector portion 28 detects various switch operations performed by a user. For example, the operation detector portion 28 detects an operation performed on an ignition switch and supplies a corresponding operation detection signal to the ECU 20. A door open-close detector portion 30 detects an open or closed state of a driver's side door (or of each door of the vehicle) and sends a corresponding detection signal to the ECU 20. An immobilizer switch 32 detects connection of a transponder portion of the portable device to the instrument panel, and supplies a corresponding detection signal to the ECU 20.

The ECU 20 is also connected to a steering lock portion 40, an immobilizer portion 42, a door locking portion 44, an immobilizer amplifier 46, and a communication check transponder circuit 100. The steering lock portion 40 is a mechanism for mechanically prohibiting operation of a steering. The immobilizer portion 42 is a mechanism for prohibiting fuel supply and ignition operation. The door locking portion 44 is a mechanism for locking and unlocking all the doors.

The immobilizer amplifier 46 supplies power to a transponder circuit of an emergency key via high-frequency waves and supplies an ID code received from the transponder circuit to the ECU 20. The ECU 20 is also connected to an engine control portion 48. The engine control portion 48 is capable of controlling the start of an engine 50 by using a self-starting motor and is also capable of controlling stop of the engine 50.

The communication check transponder circuit 100 supplies a specific transponder ID code to the ECU 20. In the ECU 20, the ID code is compared with the ID code stored in the memory to check for a failure of such determination backup means as the ECU 20.

Figure 2:
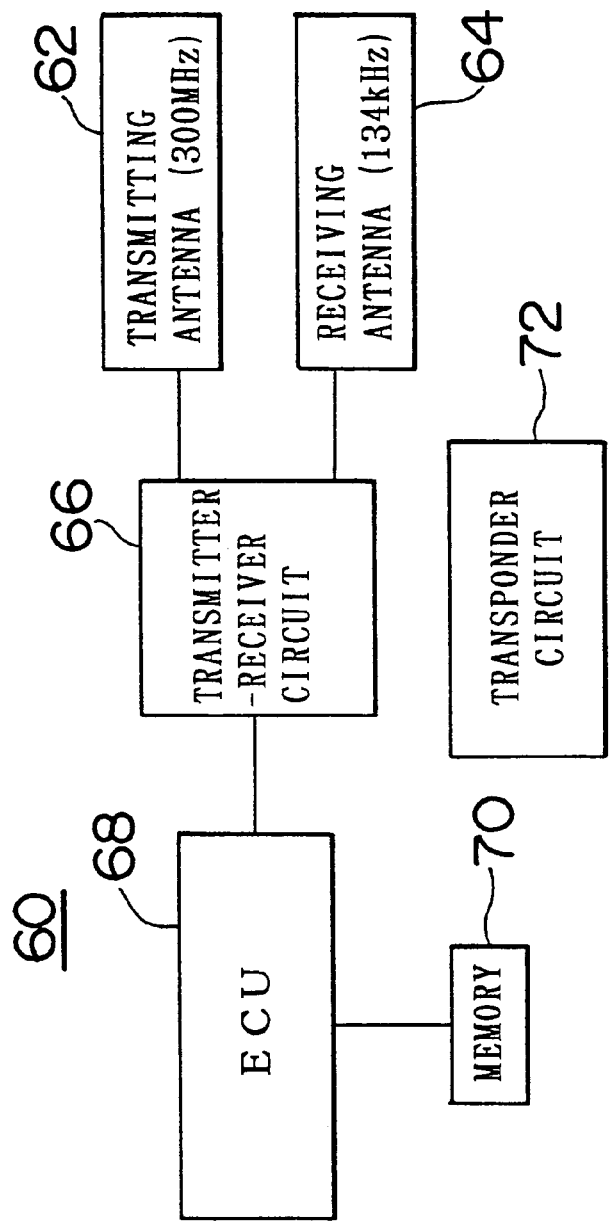
FIG. 2 is a block diagram of an embodiment of the portable device of the vehicle security control apparatus of the invention.

FIG. 2 is a block diagram of an embodiment of the portable device of the vehicle security control apparatus of the invention. Referring to FIG. 2, the portable device 60 has a transmitting antenna 62 and a receiving antenna 64. The antennas 62, 64 are connected to a transmitter-receiver circuit 66. The transmitter-receiver circuit 66 is connected to an ECU 68.

The request signal received from the vehicle-installed device 10 via the receiving antenna 64 has a signal frequency of, for example, 134 kHz. The request signal is demodulated by the transmitter-receiver circuit 66 and then supplied to the ECU 68. The ECU 68 reads first and second codes from a memory 70, and supplies the codes to the transmitter-receiver circuit 66. The first and second codes are modulated by the transmitter-receiver circuit 66, so that corresponding to each code, a signal having a frequency of, for example, 300 MHz, is transmitted from the transmitting antenna 62 to the vehicle-installed device 10.

The portable device 60 is provided with a separate transponder circuit 72. The transponder circuit 72 has therein a resonance circuit and a register. Upon receiving high-frequency waves transmitted from the immobilizer amplifier 46 via an immobilizer coil, the transponder circuit 72 stores the energy of high-frequency waves as electric power into the resonance circuit, and transmits its specific transponder ID code read from the register. The transponder ID code is supplied to the ECU 20 of the vehicle-installed device 10 via the immobilizer coil and the immobilizer amplifier 46.

FIG. 3 is a schematic illustration of communication between the first and second transmitting antennas 11, 12 and the portable device 60. Referring to FIG. 3, the first signal request having a frequency of 134 kHz is transmitted from the first transmitting antenna 11 of the vehicle-installed device 10. The second request signal having a frequency of 134 kHz is transmitted from the second transmitting antenna 12 of the vehicle-installed device 10. Upon receiving the first or second request signals, the portable device 60 sends back a signal of a frequency of 300 MHz obtained by demodulating the first or second code in accordance with the received request signal. The signal of the frequency of 300 MHz received by the receiving antenna 22 of the vehicle-installed device 10 is demodulated by the receiver circuit 24 and then supplied to the ECU 20. The ECU 20 thus receives the first or second code.

FIG. 4 is a flowchart illustrating an embodiment of the engine start operation executed by the ECU 20 in the apparatus of the invention. The ECU 20 executes this operation periodically (for example, every 200 ms) while all the relevant mechanisms and the like are locked. In step S10 in FIG. 4, the ECU 20 causes the first transmitter portion 14 to transmit the 134 kHz request signal obtained by modulating the first request code from the first transmitting antenna 11. Subsequently in step S12, the ECU 20 determines whether an answer signal has been received from the portable device 60 by the receiver circuit 24. If an answer signal is received, the operation proceeds to step 14, in which the ECU 20 compares the demodulated code supplied from the receiver circuit 24 with the first code stored in the memory 26. If it is determined in step S12 that an answer signal has not been received from the portable device 60, or if it is determined in step S14 that the demodulated code does not conform to the first code, the operation goes back to step S10. If an answer signal is received from the portable device 60 and the demodulated code conforms to the first code, the operation proceeds to step S16.

If a user carrying an authorized portable device 60 approaches the vehicle, the portable device 60 receives, via the receiving antenna 64, the 134 kHz request signal obtained by modulating the first request code, The portable device then transmits, via the transmitting antenna 62, the 300 MHz signal obtained by modulating the first code in accordance with the first request code. Therefore, it is determined in step S14 that the demodulated code conforms to the first code, and the operation proceeds to step S16. In step S16, the ECU 20 controls the door locking portion 44 to unlock all the doors since it has been determined that the user has approached the vehicle is carrying the authorized portable device 60.

Subsequently in step S18, the ECU 20 causes the second transmitter portion 16 to transmit the 134 kHz request signal obtained by modulating the second request code, from the second transmitting antenna 12 provided in or near the instrument panel in the compartment. Subsequently in step S20, ECU 20 determines whether an answer signal to the second request code has been received from the portable device 60 by the receiver circuit 24. If an answer signal is received, the ECU 20 compares, in step S22, the demodulated code supplied from the receiver circuit 24 with the second code stored in the memory 26. If an answer signal is not received, or if the demodulated code does not conform to the second code, the operation goes back to step S18. If an answer signal is received from the portable device 60 and the demodulated code conforms to the second code, the operation proceeds to step S24.

Therefore, if the user carrying the authorized portable device 60 has entered the compartment of the vehicle, the ECU 20 controls the steering lock portion 40 to unlock the steering lock. The ECU 20 further controls the immobilizer portion 42 to cancel the prohibition of fuel supply to the engine 50 and cancel the prohibition of the ignition operation, in step S24. As a result, the user is allowed to turn the ignition key start the engine 50 via the engine control portion 48.

Figure 5A:
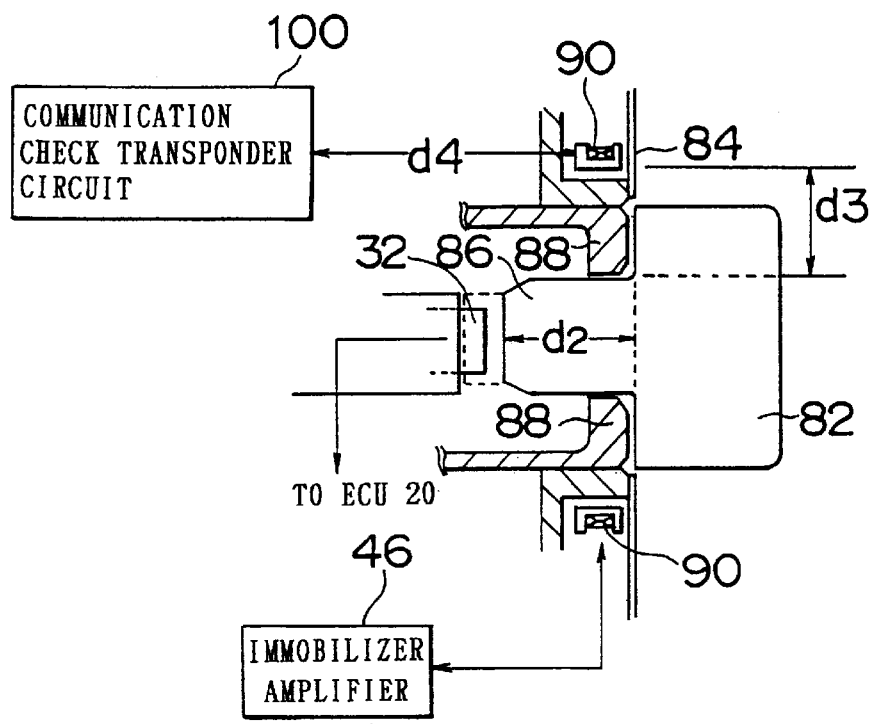
FIGS. 5A and 5B are a sectional view and a plan view of an embodiment of the ignition switch according to the apparatus of the invention.
Figure 5B:
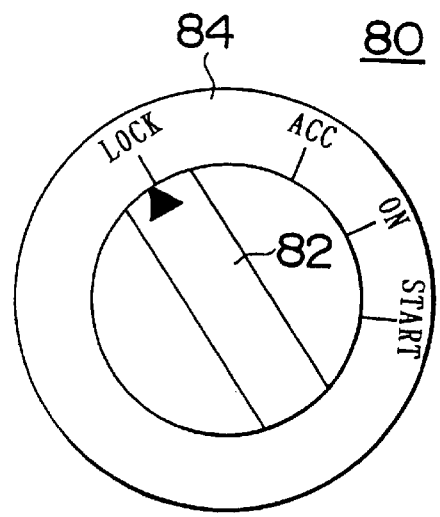

FIGS. 5A and 5B are a sectional view and a plan view of an embodiment of the ignition switch according to the vehicle security control apparatus of the invention. An ignition switch 80 is provided in the instrument panel in the compartment. As shown in FIG. 5B, an operating knob 82 is turned to either an engine stop position (LOCK), an accessory position (ACC), an engine drive position (ON), or an engine start position (START) as indicated in a position indicator area 84, in order to select a desired state of the engine and the electric power source of the vehicle.

In a conventional vehicle, a key is inserted in place of the operating knob 82 to select a state of the engine or the electric power source. In the invention, however, since the portable device 60 is employed as an electronic key, the operating knob 82 is provided instead of the conventional key. In this embodiment, a protrusion 86 of the operating knob 82 is fitted into a support portion 88 provided in the instrument panel as shown in FIG. 5A. The operating knob 82 is removable from the support portion 88.

The immobilizer switch 32 is disposed inside the instrument panel in such a manner as to face a distal end of the protrusion 86 of the operating knob 82 while leaving a space therebetween. Since the distal end of the protrusion 86 of the operating knob 82 is spaced from the immobilizer switch 32, the immobilizer switch 32 is in an off-state. An immobilizer coil 90 surrounds the support portion 88. The immobilizer coil 90 is connected to the immobilizer amplifier 46.

Further, the communication check transponder circuit 100 is disposed in the vicinity of the immobilizer coil 90. The transponder circuit 100 has therein a resonance circuit and a resistor. Upon receiving high-frequency waves transmitted from the immobilizer amplifier 46 via the immobilizer coil 90, the transponder circuit 100 stores the energy of high-frequency waves as electric power into the resonance circuit, and transmits its specific transponder ID code read from the register. The transponder ID code is supplied to the ECU 20 of the vehicle-installed device 10 via the immobilizer coil 90 and the immobilizer amplifier 46. In an emergency case such as when the cell disposed in the portable device 60 becomes discharged, the communication check transponder circuit 100 checks for failures of determination backup means such as the immobilizer amplifier 46, the immobilizer coil 90, and the ECU 20, which are activated for comparing the ID with the portable device 60.

FIG. 8 is a flowchart illustrating an embodiment of the failure check operation executed by the ECU 20 on the immobilizer amplifier 46, the immobilizer coil 90, and the like. This operation starts when an operation of the operation knob 82, for example, is detected. The failure check operation is stopped when the immobilizer switch 32 detects the connection of the transponder portion 60B of the portable device 60 to the support portion 88. Referring to the same figure, first, it is determined whether the ignition switch 80 has been turned to start the engine, for example, and whether the ignition switch 80 is at the accessory position (ACC) for activating the accessories. If the ignition switch is at a position other than the accessory position, the failure check operation is not executed. Further, the failure check operation is not executed when the immobilizer switch 32 detects the connection of the transponder portion 60B of the portable device 60 to the support portion 88. Therefore, the failure check operation is executed (step 44) when an affirmative judgment is made in step 40 and a negative judgment is made in step 42. When the failure check operation is started, first in step 46, the ECU 20 causes the immobilizer amplifier 46 to output high-frequency waves having a frequency of, for example, 134 kHz, for a predetermined length of time. The high-frequency waves are supplied from the immobilizer amplifier 46 to the immobilizer coil 90, and transmitted from the immobilizer coil 90. The communication check transponder circuit 100, which is provided in the vicinity of the immobilizer coil 90, receives the high-frequency waves by using the resonance circuit, stores the energy of the high-frequency waves in the form of electric power, and transmits the specific communication check transponder circuit ID code in the form of a signal having a frequency of, for example, 134 kHz.

Next, the ECU 20 stops the immobilizer amplifier 46 from outputting high-frequency waves, and reads a specific communication check transponder ID code supplied thereto by the immobilizer amplifier 46 amplifying and demodulating a signal received by the immobilizer coil 90. Subsequently in step 48, the ECU 20 determines whether the communication check transponder ID code has been received, and determines whether the received communication check transponder ID code conforms to the communication check transponder ID code stored in the memory 26. If a communication check transponder ID code is not received, or if the communication check transponder ID code supplied from the immobilizer amplifier 46 does not conform to the communication check transponder ID code stored in the memory, the operation proceeds to step 54, and it is determined that the immobilizer amplifier 46, the immobilizer coil 90, and the like are abnormal. The user is informed of such abnormalities. On the other hand, if the supplied code conforms to the communication check transponder ID code stored in the memory, it is determined that the immobilizer amplifier 46, the immobilizer coil 90, and the like are operating normally. Then, the operation proceeds to step 52 and the failure check operation is terminated.

By executing this failure check operation, it is possible to check periodically if there is any failure in determination backup means such as the immobilizer amplifier 46, immobilizer coil 90, the ECU 20, and the like. Therefore, in an emergency case such as when the cell disposed in the portable device 60 becomes discharged, a problem of failing to spot the failure in these determination backup means until the time when the transponder portion 60B of the portable device 60 is connected to the support portion 88 can be prevented.

In the above mentioned embodiment, to prevent the transmitting signals transmitted by the communication transponder circuit and the transponder portion 60B of the portable device 60 from interfering with each other, due to the communication transponder circuit and the transponder portion 60B simultaneously transmitting signals corresponding to the immobilizer amplifier 90, the operation of the communication check transponder circuit is stopped when the immobilizer switch 32 detects the connection of the transponder portion 60B to the support portion 88. However, the interference can also be prevented by disposing the communication check transponder circuit 100 at some distance from the immobilizer coil 90. In detail, as shown in FIG. 5, a distance d3 between the communication check transponder circuit and the immobilizer coil 90 is longer than a distance d4 between the transponder portion 60B of the portable device 60 connected to the support portion 88 and the immobilizer coil 90 (d3>d4). This enables receiving of the ID code from the transponder portion 60B with priority when there is a possibility of simultaneously receiving the signals from the transponder portion 60B of the portable device 60 and the communication check transponder circuit 100 by the immobilizer amplifier 36 via the immobilizer coil 90. Accordingly, the interference of the signals from the communication check transponder circuit 100 and the transponder circuit is prevented. Further, to make it possible to receive the ID code from the transponder portion 60B with priority, an output from the transponder portion 60B may be set at a higher level than an output from the communication check transponder circuit.

Figure 6:
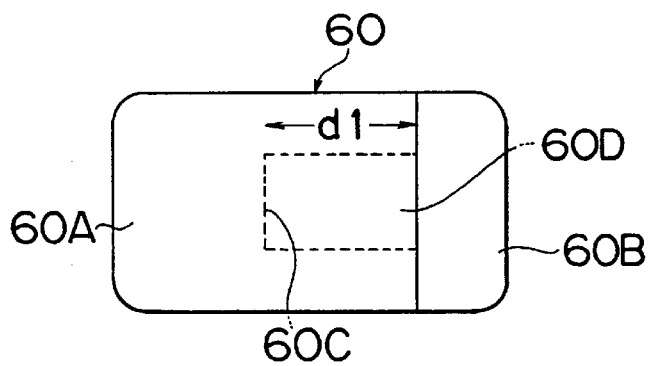
FIG. 6 is a side view of an embodiment of the portable device in the apparatus of the invention.

FIG. 6 is a side view of an embodiment of the portable device 60 of the vehicle security control apparatus of the invention. Referring to FIG. 6, the portable device 60 is separable into a main body portion 60A and a transponder portion 60B. Normally, a protrusion 60D formed in the transponder portion 60B is firmly fitted into a recess 60C formed in the main body portion 60A, so that the portable device 60 is used as a single unit. For use in an emergency case, for example, in a case where the battery cell of the portable device 60 becomes discharged, the main body portion 60A and the transponder portion 60B are separated from each other. The protrusion 60D of the transponder portion 60B has substantially the same diameter as the protrusion 86 of the operating knob 82, and has a length d1 that is greater than a length d2 of the protrusion 86 of the operating knob 82.

The transmitting antenna 62, the receiving antenna 64, the transmitter-receiver circuit 66, the ECU 68, the memory 70 as shown in FIG. 2, and a battery cell as a power source for these components are disposed in the main body portion 60A. The transponder circuit 72 is disposed in the transponder portion 60B. It is also possible to dispose all of the transmitting antenna 62, the receiving antenna 64, the transmitter-receiver circuit 66, the ECU 68, the memory 70, the cell, the transponder circuit 72 within the transponder portion 60B.

In an emergency case such as when the cell disposed in the portable device 60 becomes discharged, the portable device 60 is separated into the main body portion 60A and the transponder portion 60B. After the operating knob 82 of the ignition switch 80 is removed from the support portion 88 provided in the instrument panel, the protrusion 60D of the transponder portion 60B is inserted and fitted into the support portion 88. Since the length of the protrusion 60D of the transponder portion 60B is greater than the length of the protrusion 86 of the operating knob 82, the distal end of the protrusion 60D contacts the immobilizer switch 32 as indicated by a broken lines in FIG. 5 so that the immobilizer switch 32 is turned on.

Figure 7:
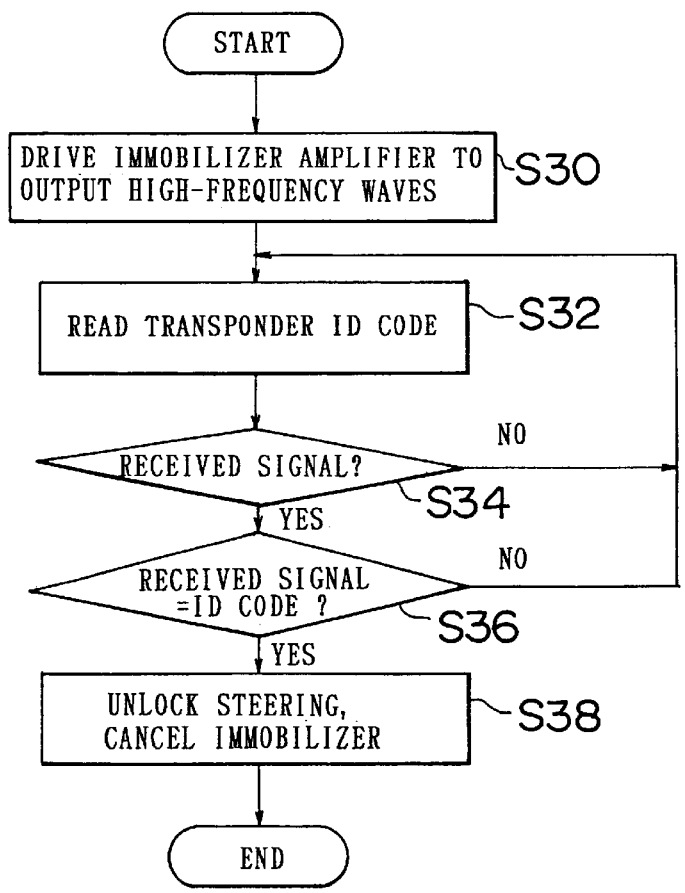
FIG. 7 is a flowchart illustrating an embodiment of the emergency operation executed by the ECU of the apparatus of the invention.

FIG. 7 is a flowchart illustrating an embodiment of the emergency operation executed by the ECU 20 of the apparatus of the invention. This operation starts when the immobilizer switch 32 turns on. In step 30 in FIG. 7, the ECU 20 causes the immobilizer amplifier 46 to output high-frequency waves having a frequency of, for example, 134 kHz, for a predetermined length of time. The high-frequency waves are supplied from the immobilizer amplifier 46 to the immobilizer coil 90, and transmitted from the immobilizer coil 90.

The transponder circuit 72 provided in the transponder portion 60B receives the high-frequency waves by using the resonance circuit, stores the energy of the high-frequency waves in the form of electric power, and transmits the specific transponder ID code in the form of a signal having a frequency of, for example, 134 kHz.

Subsequently in step S32, the ECU 20 stops the immobilizer amplifier 46 from outputting high-frequency waves, and reads a code supplied thereto by the immobilizer amplifier 46 amplifying and demodulating a signal received by the immobilizer coil 90. Subsequently in step S34, the ECU 20 determines whether the received code is a transponder ID code, that is, whether a transponder ID code has been received. If a transponder ID code has been received, the ECU 20 determines in step S36 whether the received transponder ID code conforms to the ID code of the corresponding transponder circuit stored in the memory 26. If a transponder ID code is not received, or if the code supplied from the immobilizer amplifier 46 does not conform to the ID code stored in the memory 26, the operation goes back to step S30. If the supplied code conforms to the ID code stored in the memory 26, the operation proceeds to step S38.

If a user inserts the transponder portion 60B of the authorized portable device 60, instead of the operating knob 82, into the support portion 88 provided in the instrument panel, the ECU 20 enters an emergency mode. In step S38, the ECU 20 controls the steering lock portion 40 to release the steering lock, and controls the immobilizer portion 42 to cancel the prohibition of both the fuel supply to the engine 50 and the ignition operation. As a result, when the user turns the transponder portion 60B to the predetermined position, the engine 50 is started by the engine control portion 48. In the emergency mode, the ECU 20 prohibits the unlocking of the trunk door and the fuel cap. This unlock prohibition prevents theft of articles stored in the trunk and restricts fuel supply at the time of the unauthorized start of the engine 50 for the purpose of stealing the vehicle or the like, so that the damage is minimized.

As described above, the vehicle-installed device 10 of the vehicle security control apparatus compares the code of the transponder portion 60B of the portable device 60 with the code stored in the vehicle-installed device 10 when the transponder portion 60B is inserted or connected to the support portion 88 provided in the instrument panel in the vehicle. Based on the result of code comparison, the apparatus determines whether to permit or prohibit use of the vehicle. Therefore, even at the time of depletion of the battery cell of the portable device 60 or occurrence of radio interference, the vehicle security control apparatus is able to permit the use of the vehicle. Furthermore, the immobilizer switch 32 detects the insertion or connection of the transponder portion 60B to the support portion 88 and then operates the immobilizer amplifier 46. Therefore, if at least a portion of the portable device is not connected to the ignition switch 80, the immobilizer amplifier 46 is not operated and useless power consumption is prevented. In addition, there is substantially no danger of cross talk or radio interference even if a determination backup device and a determining device use signals of the same frequency. Therefore, the same signal frequency can be used for the determination backup device and the determining device, so that the efficiency in utilizing high frequency waves improves.

At the time of depletion of the battery of the portable device or occurrence of radio interference, the transponder portion 60B is inserted into the ignition switch 80 in place of the operating knob 82, so that a user is allowed to start the engine of the vehicle by operating the transponder portion 60B (that is, at least a portion of the portable device connected to a connecting portion) substantially in the same manner as a conventional key. Furthermore, since the transponder circuit 72 is brought close to the immobilizer coil 90 in the aforementioned situation, power supply to the transponder circuit 72 can be efficiently performed.

Although in the foregoing embodiments, the portable device 60 is separable into the main body portion 60A and the transponder portion 60B, this construction is not restrictive. For example, it is possible to provide a protrusion in the portable device 60, so that the entire portable device 60 is connected to the support portion 88 provided in the instrument panel by inserting and fitting the protrusion into the support portion 88. It is also possible to provide a support portion in the operating knob 82 of the ignition switch 80, so that the operating knob 82 is not removed from the ignition switch 80 but the protrusion 60D of the transponder portion 60B is fitted into the support portion of the operating knob 82.

If the immobilizer switch 32 shown in FIG. 5 is turned on and therefore the emergency mode is entered, the normal determining device may be stopped. That is, a step of stopping the inside-compartment request may be added before step S30 in the flow chart shown in FIG. 7. If this step is added, the communication between the immobilizer coil 90 and the transponder circuit 72 will not be hampered. Further, in the abovementioned embodiment, the immobilizer switch is disposed inside the instrument panel in such a manner as to face a distal end of the protrusion 86 of the operating knob 82 while leaving a space therebetween, however, the position of the immobilizer switch is not limited to this. The immobilizer switch may be disposed at any position as long as the connection of the transponder portion 60B of the operation knob 82 to the instrument panel is detectable.

Although the foregoing embodiments are designed to permit the engine to be started, the invention is also applicable to an apparatus that permits a door, a trunk door or the like to be opened or closed. For this application, a transponder starting coil similar to the immobilizer coil 90 is provided in a door handle or the like in a vehicle. At the time of depletion of the battery of the portable device 60 or occurrence of radio interference, the portable device 60 is brought close to the transponder starting coil to start the transponder circuit 72, and the door unlocking control is performed if the codes match.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements included within the spirit and scope of the invention.

What is claimed is:

1. A vehicle security control apparatus comprising:
   a portable device capable of being carried and of transmitting a signal;
   a vehicle-installed device that receives the signal from the portable device, the vehicle-installed device being provided in a vehicle;

a determiner that determines whether a use of the vehicle is authorized based on a result of code comparison through remote communication between the vehicle-installed device and the portable device;

a connecting portion provided in the vehicle;

a switch device provided in the portable device and connectable to the connecting portion; and a backup device, in communication with the connecting portion, that permits the use of the vehicle by performing the code comparison when the switch device is connected to the connecting portion and the determiner has not determined whether use of the vehicle is authorized.

2. A vehicle security control apparatus according to claim 1, wherein the portable device transmits corresponding signals corresponding to signals received from the vehicle-installed device, and the determiner compares the corresponding signals with a code pre-stored in the vehicle-installed device side.

3. A vehicle security control apparatus according to claim 2, wherein a range of permitted uses of the vehicle determined by the determination backup device is restricted relative to a range of a permission of the use of the vehicle determined by the determiner.

4. A vehicle security control apparatus according to claim 1, further comprising a connection detector that detects a connection of the switch device to the connecting portion and operates the determination backup device.

5. A vehicle security control apparatus according to claim 1, further comprising an operation prohibiter that prohibits the determiner from operating if the determination backup device is operating.

6. A vehicle security control apparatus according to claim 5, wherein the switch device comprises a transponder circuit that transmits a specific code, and the determination backup device receives the specific code from the transponder and compares the specific code with a predetermined code specific to the vehicle.

7. A vehicle security control apparatus according to claim 6, wherein the vehicle includes a detachable start switch for starting the engine, and the connecting portion is provided at a position from which the start switch is detached.

8. A vehicle security control apparatus according to claim 1, further comprising an engine start permitting device that permits an engine of the vehicle to be started if the determination backup device determines that the use of the vehicle is authorized.

9. A vehicle security control apparatus according to claim 8, further comprising a steering unlock permitting device that permits a steering of the vehicle to be unlocked if the determination backup device determines that the use of the vehicle is authorized.

10. A vehicle security control apparatus according to claim 1, wherein the switch device that connects to the connecting portion transmits a specific code, and the determination backup device receives the specific code from the switch device and compares the specific code with a pre-stored code specific to the vehicle.

11. A vehicle security control apparatus according to claim 10, wherein a range of permitted uses of the vehicle determined by the determination backup device is restricted relative to a range of permitted uses of the vehicle determined by the determiner.

12. A vehicle security control apparatus according to claim 1, further comprising a door open-close permitting device that permits a door to be opened or closed if the determination backup device determines that the use of the vehicle is authorized.

13. A vehicle security control apparatus according to claim 1, further comprising an engine start permitting device that permits an engine of the vehicle to be started if the determination backup device determines that the use of the vehicle is authorized.

14. A vehicle security control apparatus according to claim 1, wherein a range of permitted uses of the vehicle determined by the determination backup device is restricted relative to a range of permitted uses of the vehicle determined by the determiner.

15. A vehicle security control apparatus according to claim 1, further comprising a steering unlock permitting device that permits a steering of the vehicle to be unlocked if the determination backup device determines that the use of the vehicle is authorized.

16. A vehicle security control apparatus according to claim 1, further comprising a communication check transponder circuit provided in the vicinity of the determination backup device for communicating with the determination backup device; and a checking device for performing the code comparison through communication between the communication check transponder circuit and the determination backup device for conforming that the determination backup device operates normally.

17. A vehicle security control apparatus according to claim 16, wherein the check device is operated at a predetermined time interval.

18. A vehicle security control apparatus according to claim 16, further comprising an alarm for alarming a user when a check by the check device is not performed normally.

* * * * *